United States Patent [19]
Hoffmann

[11] 4,108,711
[45] Aug. 22, 1978

[54] LABEL FEED

[75] Inventor: Wolfgang Hoffmann, Modesto, Calif.

[73] Assignee: B & H Manufacturing Company, Inc., Ceres, Calif.

[21] Appl. No.: 771,327

[22] Filed: Feb. 23, 1977

[51] Int. Cl.$^{2}$ ........................ B32B 31/00; B26D 7/14; B26D 7/06

[52] U.S. Cl. ........................ 156/497; 83/176; 83/402; 156/521

[58] Field of Search ............... 156/521, 519, 517, 497; 83/176, 402

[56] References Cited

U.S. PATENT DOCUMENTS

| | | | |
|---|---|---|---|
| 2,158,790 | 5/1939 | Arthur | 83/176 |
| 2,543,004 | 2/1951 | Dewyer | 156/519 |
| 2,968,982 | 1/1961 | Cousino | 83/402 |
| 3,125,006 | 3/1964 | Weicher et al. | 156/530 |
| 3,143,016 | 8/1964 | Obenshain | 83/402 |
| 3,353,432 | 11/1967 | Philippi | 83/176 |
| 3,865,671 | 2/1975 | Kronsder | 156/521 |
| 4,025,382 | 5/1977 | Del Rosso | 156/497 |
| 4,029,537 | 6/1977 | Kish | 156/497 |

*Primary Examiner*—Douglas J. Drummond
*Attorney, Agent, or Firm*—Edward B. Gregg

[57] ABSTRACT

An improved label feed comprising a first roller means for feeding an elongated parent strip of label material into the labeling apparatus, guide means in advance of the first roller means, cuttng means in the form of a rotary blade and an oscillating stationary blade adjacent the guide means for severing individual labels from the parent strip, and second roller means in advance of the cutting means for feeding the label strips onto a vacuum drum or the like for application to containers. A leaf spring is disposed above the parent strip adjacent the stationary blade and oscillates therewith. The guide means has air jets for directing streams of air against the parent strip before it is fed into the cutting means, to insure adequate feeding of limp label material. The second roller means can be a single pair of rollers, with a driven roller disposed beneath the label and a biased roller disposed above the label, or, in the case of very short labels, an additional pair of rollers disposed between the first pair and the cutting means, with the driven roller of the second pair being disposed above the strip and the biased roller thereof being disposed below the strip.

1 Claim, 5 Drawing Figures

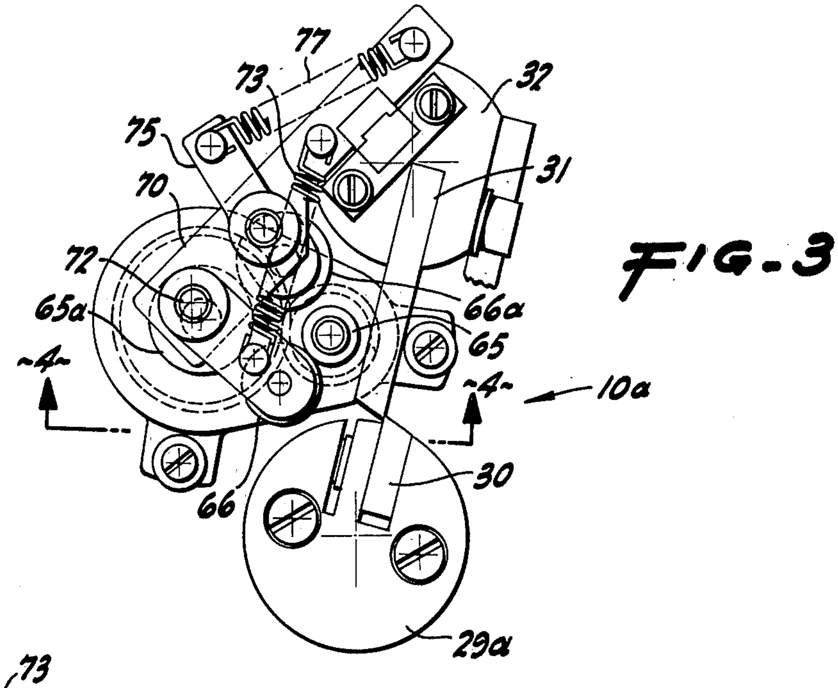
FIG-3
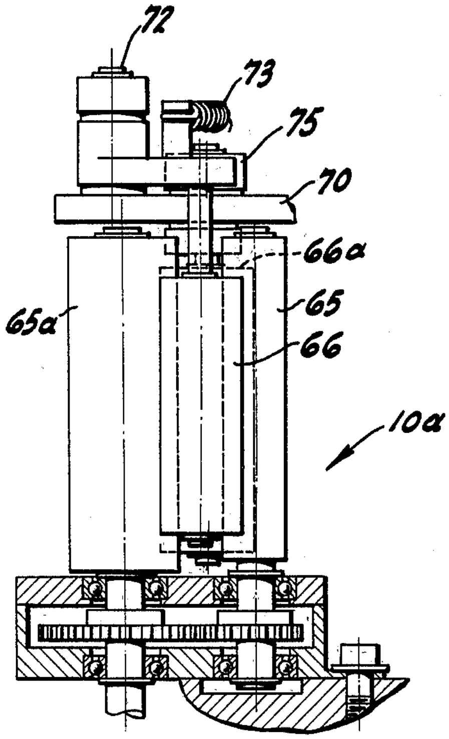
FIG-4
FIG-5
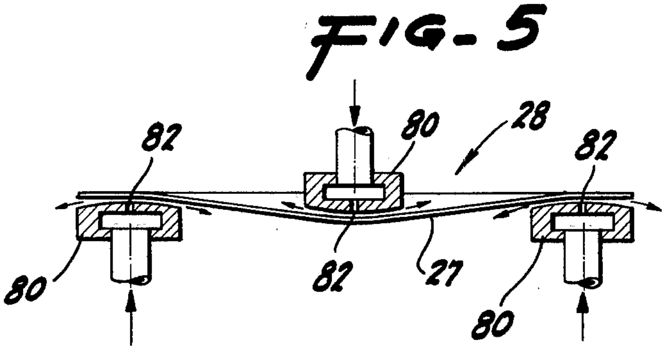

LABEL FEED

This invention relates to a label feed for automatically feeding the labels at high speed for application to containers, and is an improvement upon my U.S. Pat. No. 3,765,991 and my application Ser. No. 480,044, filed June 17, 1974 entitled "APPARATUS FOR APPLYING LABELS TO CONTAINERS".

In the aforesaid patent and patent application, there are described machines for applying labels to containers having general features as follows: A container feed such as a turret having pockets for holding the containers is employed and serves to carry each container, in turn, past a glue applicator station which applies a line of glue to the container and then passes each container, in turn, tangentially to a vacuum drum which bears labels, each having its trailing end provided with a line of glue. The containers are gripped during this period to avoid rotation about their individual axes, whereby as each container is presented to the tangent point of contact with the drum, the leading end of each label is applied to the container at the glue line previously applied to the container. The container is then transported away from the vacuum drum and is caused to rotate about its axis which results in wrapping the label around the container.

The vacuum drum is equipped with lands on which the trailing edge of each label is applied, the label being held on the drum by vacuum. A glue applicator applies glue to the trailing end of the label overlying the land. immediately to the rear of and adjacent to each land is a trough or groove which serves the function of holding any excess glue. The labels themselves are supplied as a continuous label stock and are cut by a shearing action of a rotary blade and a stationary blade. The stationary blade, however, is oscillated into an outer contact with the rotating blade so as not to impede access of the label material to the cutting instrumentalities.

The particular mechanisms just described, although preferably employed in accordance with the present invention, as shown in the drawings, need not be exactly as described but may vary, inasmuch as the invention pertains to certain improvements which will be described shortly.

Machinery of this type, while it has served well in the high speed application of labels to containers, encounters difficulties especially when the labels are short, such that it is difficult to bridge the gap between the cutting instrumentalities and the vacuum drum, and also where the labels are of limp material, for example certain plastic materials, such that the labels tend to flop about and cause difficulties.

It is an object of the present invention to provide improvements in label feeds of the general character described.

It is a further and particular object of the invention to provide a label machine of the general character described which is better adapted to application of small labels.

It is a further object of the invention to provide machinery of the general character described which is better adapted than heretofore to process labels made of very limp material.

The above and other objects of the invention will be apparent from the ensuing description and the appended claims.

Certain embodiments of the invention are shown by way of example in the accompanying drawings, in which:

FIG. 3 is a fragmentary view in side elevation showing the transfer rollers of FIG. 2 in elevation and showing the means for biasing the idler rollers;

FIG. 4 is a bottom view seen along the line 4 — 4 of FIG. 3; and

FIG. 5 is a section taken along the line 5 — 5 of FIG. 2 showing the jet means employed to assist in the transfer of labels.

Figure 1:
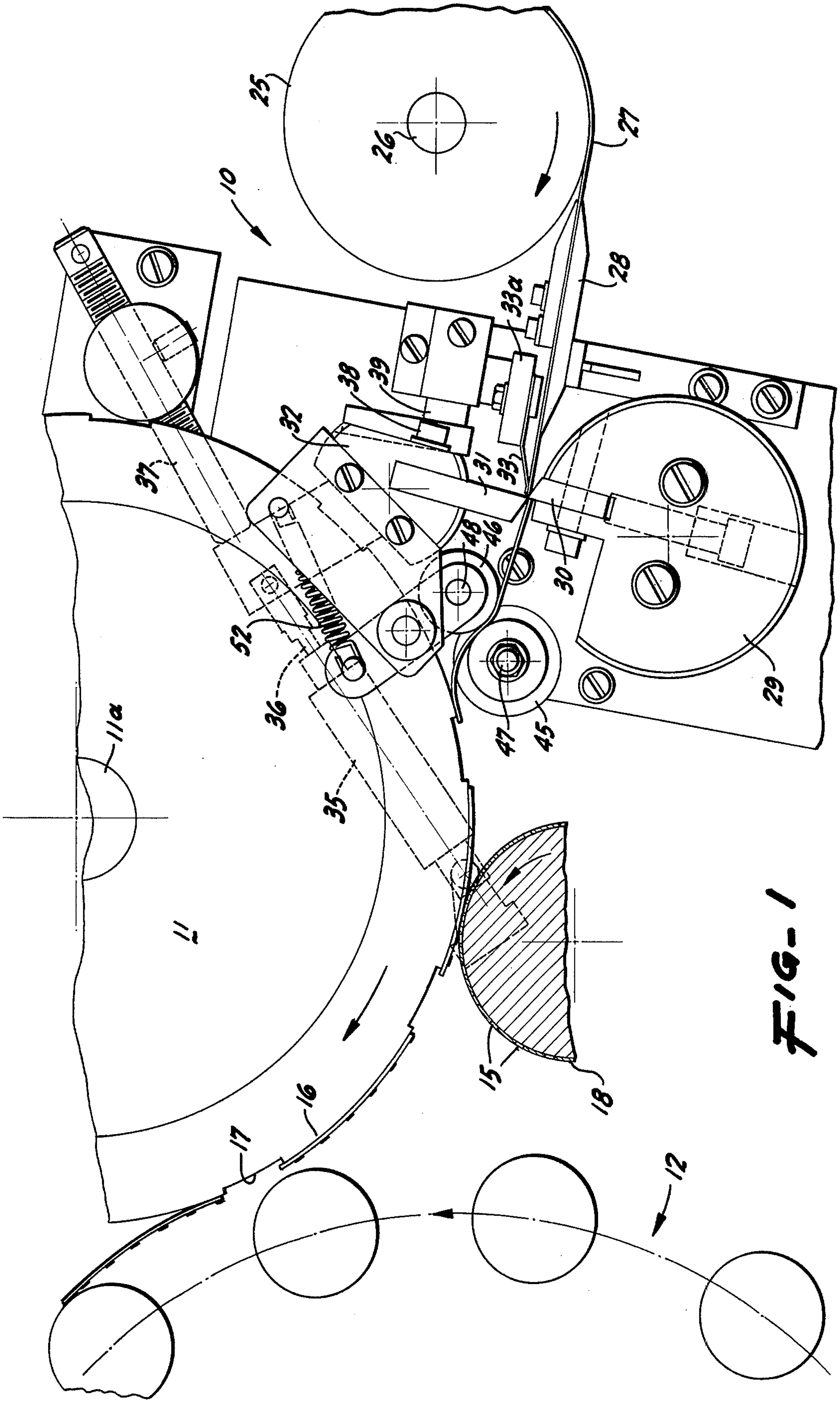
FIG. 1 is a view in side elevation of a machine in accordance with the invention, showing the label feed means for feeding a continuous strip of label material, cutting instrumentalities, a vacuum drum and the container feed, together with intermediate transfer rollers in accordance with the present invention.

Referring now to FIG. 1, the labeling machine is generally designated by the reference numeral 10 and comprises a vacuum drum 11 on a shaft 11*a;* a container feed is shown generally at 12 as conveying containers 12 into tangential contact with the vacuum drum. The container feed may be a turret-type of feed or any other suitable type of feed and, as explained above, it may embody means for gripping the containers and holding them stationary during transit through that portion of the apparatus shown, until the label has been applied to a container and it is allowed to roll freely. However, so far as the invention is concerned this is optional. The vacuum drum 11, as in the aforementioned patent and patent application, has axial grooves 17 to receive any excess glue that may be present. However, instead of having a single land or similar ridge adjacent each groove 17, the drum may be smooth (as shown) or have lands at both edges of the groove 17. This is because glue is applied only to the labels 16, and not to the containers. The glue is applied through holes 15 of applicator 18, either over the leading and trailing portions of the label or over the entire exposed surface thereof. Any desired pattern of glue can be applied to the label in such manner.

If the techniques of the aforesaid patent and patent application are employed, the leading end of each label is applied to the container as the container and the drum are brought into tangential contact, thereby adhering that label to the container. Suitable vacuum and release means are employed, such that when a label has been applied to a drum and has reached a point such as shown in the upper left of FIG. 1, the label is released and the container begins to rotate about its own axis, resulting in wrapping label around the container, the lead end being adhered to the container and the trailing end overlapping the leading end when the label has been completely wrapped around a container, as described in the aforesaid patent and patent application. However, as stated above, for purposes of the present invention this particular technique, although preferred, is optional.

A feed roller 25 on shaft 26 serves to supply a continuous label stock 27 which has been suitably printed. The label stock is then fed through a guide 28 which may be a simple mechanical guide but, preferably, has air jets to serve a purpose which is described below in connection with FIG. 5.

The label stock 27 is severed into individual labels 16 by a cutting mechanism including rotary cutter 29 having knife 30 bolted, as shown, to a support, and a stationary, albeit oscillating, knife 31 held in a holder 32. Knife 31 is pivoted out of the way during part of each cycle to allow passage of label stock 27, but is held stationary at the time of cutting by the blades 30 and 31, such oscillating operation being accomplished by the mechanism described below. A leaf spring 33 on a bracket 33*a* supported on a frame oscillates with knife 31 and urges label stock toward both knives 30 and 31.

Knife holder 32 is pivoted to and from the position shown in FIG. 1 by suitable means, for example that shown at 147, 148 in FIG. 9 of my copending application Ser. No. 480,044 entitled "APPARATUS FOR APPLYING LABELS TO CONTAINERS" filed June 17, 1974 or by hydraulic cylinder 35 and rod 36. Stops 37, 38 and 39 are provided to limit movement of the knife 31, stop 37 including a spring (not shown) to return stationary knife 31 to a cutting position Rollers 45 and 46 rotatable on shaft 47 and 48, respectively, grip label stock 27 just before an individual label 16 is cut therefrom and retain this grip until the leading end of the severed label is in contact with the vacuum drum 11 and is held by vacuum thereon. Roller 45 is driven and roller 46 is an idler roller. Feed roller 25, rotary cutter 29, vacuum drum 11 and glue applicator 18, and the container feed 12, as well as driven roller 45 and the oscillating means for oscillating knife 31, are all operated in suitable synchronism by means well known in the art and requiring no description herein.

Idler roller 46 is supported on a lever bracket 49, pivoted at 50 on a frame bracket 50*a*. The opposite end of lever bracket 49 is secured to one end of a spring 52, the other end of which is secured to frame bracket 50*a*. Spring 52 urges idler roller 46 against driven roller 45 to firmly grip the label stock between the two rollers and to retain the grip on the severed label until it has been supplied to and secured by vacuum to the drum 11. Such resilient relationship between the rollers 45 and 46 accommodates strips of different thickness, as well as imperfections of variations in label stock.

Figure 2:
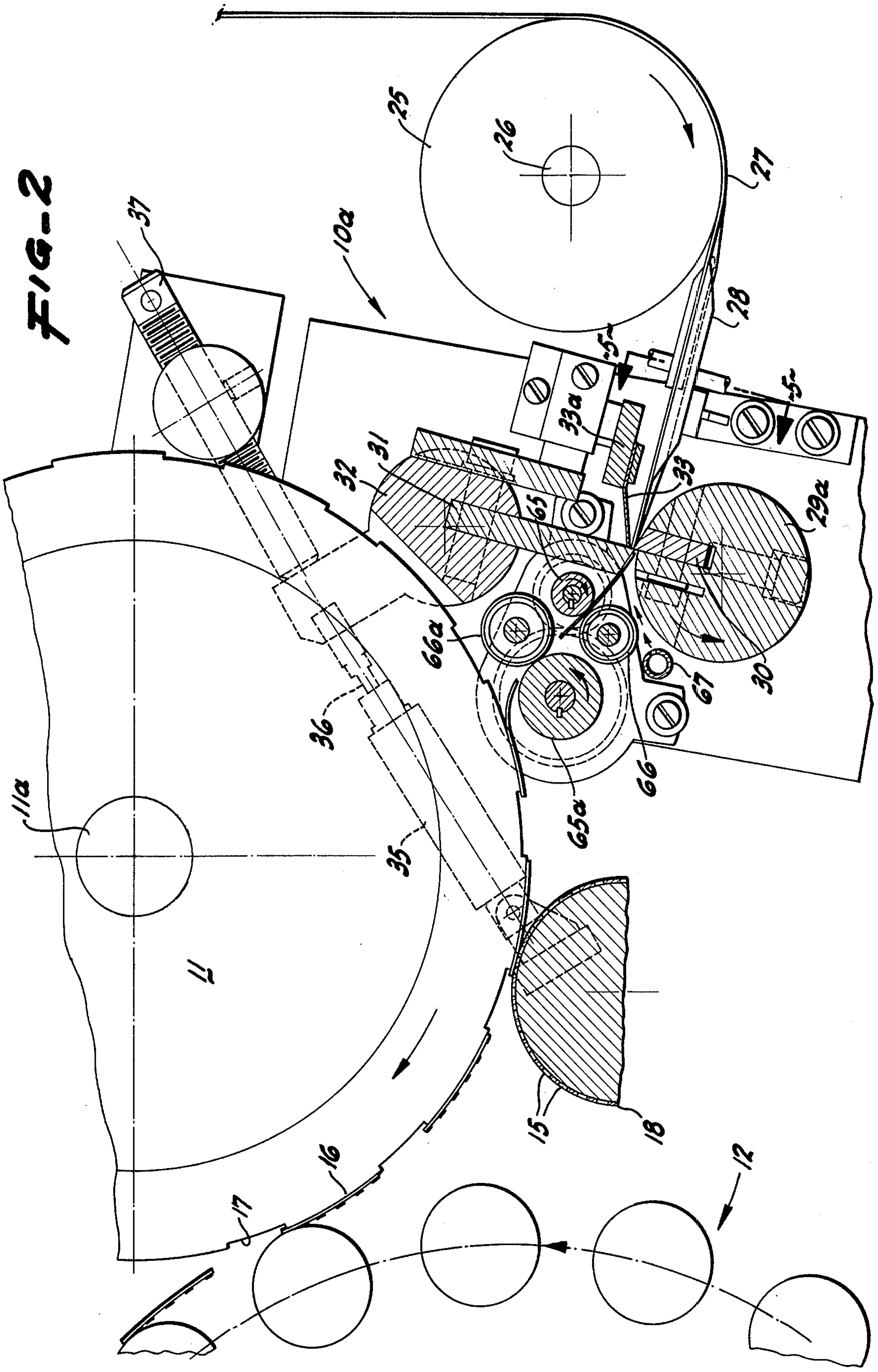
FIG. 2 is a view similar to FIG. 1 but of a modification in which two pairs of transfer rollers are employed instead of one, as in FIG. 1, for the purposes of transfer of very short labels, such view also being partly in section.

Referring now to FIGS. 2, 3 and 4, a similar labeling machine is shown at 10*a*, but is modified to handle very short labels that may not span or have difficulty spanning the distance between knives 30 and 31 on the one hand, and rollers 45 and 46 on the other hand. Parts identical with parts in FIG. 1 are similarly numbered. In the embodiments shown in FIGS. 2, 3 and 4 two pairs of rollers are provided in place of a single pair of rollers 45 and 46 shown in FIG. 1. The first such pair of rollers is indicated as 65 and 66 and the second pair as 65*a* and 66*a*, rollers 65 and 65*a* being driven rollers and rollers 66 and 66*a* being idler rollers. The rotary mounting 29*a* for rotary knife 30 is of smaller diameter than the rotary mounting 29 of FIG. 1 to allow for the interposition of two pairs of rollers 65, 66 and 65*a* and 66*a* between the knives 30 and 31 on the one hand and the vacuum drum 11 on the other hand. Also, it will be seen the rollers 66 and 66*a* are of smaller diameter than the rollers 65 and 66*a*. Also shown in FIG. 2 is an air jet pipe or nozzle 67 to direct a current of air toward the severed label to support it and keep it from falling out of alignment with the rollers 65 and 66. This is especially useful in the case of labels of very limp material such as polyethelyne, polypropylene, etc., which have a considerable tendency to sag. This air jet may also be used in the apparatus of FIG. 1.

Two idler rollers 66 and 66*a* are resiliently mounted in much the same manner as the idler roller 46 in FIG. 1, allowance being made for the fact that there are two such rollers and that their positions are different. As best shown in FIG. 3, a frame bracket 70 carries a pivot arm 71 pivoted at 72 on the bracket and rotatably carrying idler roller 66 at its other end. Spring 73 fixed at one end to pivot arm 71 and its other end to bracket 70 holds idler roller 66 resiliently against driven roller 65. Pivot arm 75 is pivoted at 76 on frame bracket 70 and carries idler roller 66*a* at one end, through conventional linkage, and at the other end is fixed with spring 77 whose opposite end is fixed to bracket 70, thereby urging the roller 66*a* resiliently against driven roller 65*a*.

Referring now to FIG. 5, label stock guide 28 is there shown in cross-section. It comprises a nozzle 80 having a jet opening 82 on one side (e.g., the top side) and two such nozzles on the other side (e.g., the underside) each nozzle having an air jet 82. As is evident from FIG. 5, this placement of the air nozzles is such that the label stock 27 is given a bend or curvature in cross-section which has the effect of stiffening the label material and making it easier to span the distance between the guide 28 and the knives 30 and 31.

Operation of the machine will be evident from the foregoing description. Among the advantages of the machine are the fact that the transfer rolls 45, 46 or the two pairs of transfer rolls 65, 66 and 65*a*, 66*a* and the gap between the cutting knives and the vacuum drum therefore allow labels of short length to be accurately fed to the vacuum drum 11 at high speed. Other advantages include the air guide shown at 28 which aids in the handling of very limp label stock.

I claim:

1. In a labeling machine for labeling containers comprising a container feed for supplying containers in sequence to a label applying station, a label feed comprising a label stock feed for continuously supplying a continuous label stock, a label cutting instrumentality for severing individual labels from the continuous label stock so delivered and a rotary label transfer means adapted to pick up each severed label on its surface and to supply the severed label to a container at the label applying station, the improvement which comprises label deforming means interposed between the label stock feed and the label cutting instrumentality for imparting to the label stock a concave-convex shape in transverse cross-section thereby stiffening the label stock and diminishing its tendency to bend in a longitudinal direction and to deviate from its intended path to the cutting instrumentality, said label deforming means being in the form of an air jet instrumentality acting on opposite sides of the label stock to bend the stock along its longitudinal mid-portion to bow it longitudinally.

* * * * *